United States Patent [19]
Finney

[11] 3,728,660
[45] Apr. 17, 1973

[54] TEMPERATURE RESPONSIVE RESISTANCE ELEMENT FOR A TEMPERATURE SENSITIVE CONTROL SENSOR

[75] Inventor: Philip F. Finney, Villa Park, Ill.

[73] Assignee: Thermo-Couple Products Company, Inc., Winfield, Ill.

[22] Filed: July 16, 1971

[21] Appl. No.: 163,314

Related U.S. Application Data

[62] Division of Ser. No. 878,832, Nov. 21, 1969, Pat. No. 3,650,024.

[52] U.S. Cl. .................... 338/22 R, 338/23, 338/302
[51] Int. Cl. ............................................. H01c 7/04
[58] Field of Search ........................ 338/22 R, 24, 25, 338/28, 265, 267, 270, 302; 219/504, 505; 29/610, 612, 613, 618, 619; 73/362 AR

[56] References Cited

UNITED STATES PATENTS

| | | | |
|---|---|---|---|
| 3,440,589 | 4/1969 | Minks | 338/22 R |
| 3,085,316 | 4/1963 | Nelson | 29/613 |
| 2,535,808 | 12/1950 | Mucher | 29/618 X |

Primary Examiner—C. L. Albritton
Attorney—Fred S. Lockwood, John D. Dewey, Lloyd L. Zickert, John L. Alex, Joseph P. O'Halloran and Eugene M. Cummings

[57] ABSTRACT

A temperature responsive resistance element for a sensor used in controlling the temperature of a metal, gas or liquid mass wherein the element includes a ceramic core, a temperature sensitive resistance wire wound on the core, wherein the wire has a high coefficient of resistance change with temperature increase, a lead connected to each end of the wire having a low coefficient of resistance change with temperature change, and ceramic insulating means encapsulating the entire element except for end portions of the leads.

7 Claims, 13 Drawing Figures

PATENTED APR 17 1973

INVENTOR
PHILIP F. FINNEY

BY
Kinzer, Dorn & Zickert
ATTORNEYS

INVENTOR
PHILIP F. FINNEY

BY
Kinzer, Dorn & Zickert
ATTORNEYS 3,728,660

1

TEMPERATURE RESPONSIVE RESISTANCE ELEMENT FOR A TEMPERATURE SENSITIVE CONTROL SENSOR

This application is a division of my copending application Ser. No. 878,832, filed Nov. 21, 1969, now U.S. Pat. No. 3,650,024.

This invention relates in general to a sensor for determining the temperature of a mass, and more particularly to a temperature sensitive control sensor for determining and controlling the temperature of a cooking surface, and still more particularly to a temperature sensitive resistance element for a sensor wherein current or voltage passing therethrough is proportionate to the temperature of the element, and wherein the sensor with the element is capable of withstanding extremely high temperatures present in metal casting processes thereby enabling it to be cast directly into a metal casting, and further to a sensor capable of withstanding the environs of a gas or liquid mass.

While the sensor of the invention is especially useful in a cooking unit to control the temperature of a cooking surface, it should be recognized that it may be useful wherever there is a need for controlling the temperature of a mass, and particularly where the mass is formed through a casting process and it is desired to directly cast the sensor into the mass, and whether the mass is solid, liquid, or gas.

Heretofore, conventional thermostats have been employed to control the temperature of cooking surfaces of cooking units, and it is known that these thermostats do not provide accurate temperature control desired to preserve flavor and quality of food and to produce high rates of efficiency. The demand for more accurate control than can be provided by conventional thermostats has brought about the conception of the present invention.

The sensor of the present invention satisfies the demands of the food industry in providing the necessary close temperature control of a cooking surface in a cooking unit to maintain high efficiency while at the same time preserving flavor and quality of food. The sensor includes a uniquely constructed temperature sensitive resistance element in combination with suitable terminals having a low coefficient of resistance change with temperature change wherein the sensor may be cast directly into a metal cooking unit while maintaining its integrity during the casting process and providing suitable terminals from the cast mass to thereafter be connected into control circuitry. It will be appreciated that the cooking unit may be heated by any suitable means such as a fuel burner or an electric resistance heating element.

The sensor is connected into a control circuit so that it forms a part of a voltage divider circuit or a wheatstone bridge. Where the sensor may be connected in a voltage divider circuit, a change in resistance in the sensor will produce a proportionate change in voltage or current in the circuit that will affect the pedestal voltage of a unijunction transistor in a solid state control which in turn operates the fuel burner or electric heating element. Where the sensor is connected in a wheatstone bridge a change in sensor resistance due to a temperature change will affect the voltage of current in the wheatstone bridge to cause an unbalanced condition, wherein the resultant potential change is amplified to control a device that causes the energy input to the mass to increase or decrease to counteract the energy loss or gain detected by the sensor.

It is therefore an object of the present invention to provide an improved sensor for detecting and controlling the temperature of a solid, liquid or gas mass.

Another object of the present invention is to provide a sensor for controlling the temperature of a heated mass, wherein the sensor is constructed so that it can be cast directly into a solid heatable mass or placed directly into a liquid or gas mass while maintaining sensor integrity.

Still another object of this invention is in the provision of a sensor sensitive to temperature, and capable of withstanding handling under foundry conditions and therefore being sufficiently rugged to allow placement and securing into metal molding equipment, and wherein the sensor includes a temperature sensitive resistance element protected against poured metal from contacting same during the casting process.

A further object of the invention is to provide a sensor having a metal sheath and refractory insulation to maintain the temperature sensitive element electrically insulated from the sheath, and means for avoiding stresses on the temperature sensitive element during fabrication of the sensor.

Another object of the invention is in the provision of a temperature sensitive control sensor capable of maintaining its integrity when cast into a metal mass, and which includes terminals of a suitable size to permit electrical connections to remote control devices.

A further object of this invention is in the provision of a control sensor including a metal sheath which may be used as an electrical conductor to complete one side of the sensor electrical circuit in installations where grounded sensor circuits are desired.

A still further object of this invention is to provide in a temperature sensitive control sensor a temperature sensitive resistance element having a high coefficient of voltage or current change with temperature, and terminals having a low coefficient of voltage or current change with temperature.

A further object of this invention is to provide a sensor including a temperature sensitive resistor assembly having a temperature sensitive wire wound on a ceramic core and connected to leads for connection to terminals, wherein a heat resistive non-electrical conducting coating is applied to the element to maintain electrical insulation and to bond and maintain the wire in spatial relation, and wherein a heat resistive non-electrical conducting coating is applied to the connection between the leads and terminals to bond same together and to maintain electrical integrity.

Other objects, features and advantages of the invention will be apparent from the following detailed disclosure, taken in conjunction with the accompanying sheets of drawings, wherein like reference numerals refer to like parts, in which.

Figure 6:
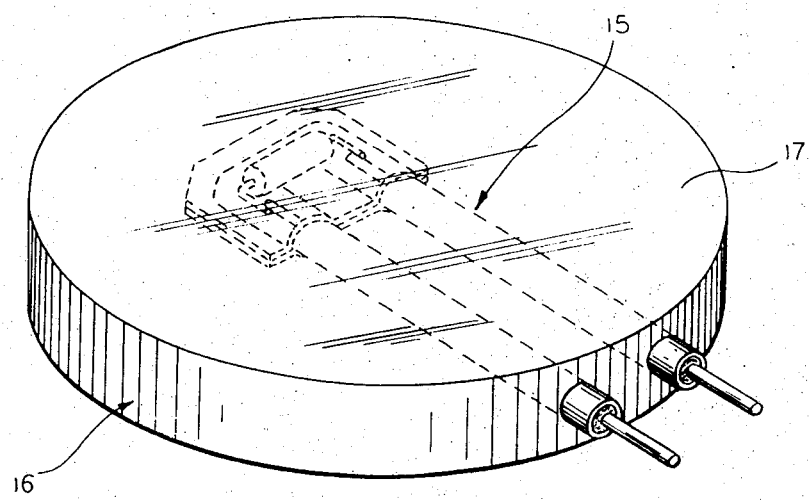
FIG. 6 is a perspective view of a cooking unit, and generally illustrating the placement of the sensor therein.

The sensor of the invention is constructed so that it can withstand metal casting processes and be cast directly in a metal mass that may for example constitute a cooking unit for food. For example, it may be cast in aluminum, and therefore, must withstand extremely high temperatures such as about 1300° F. One form of sensor construction is illustrated by the sensor 15, which is shown in FIGS. 1 to 4. The sensor 15 is illustrated in FIG. 6 as it would be cast into a metal mass 16 constituting a cooking unit having a cooking surface 17. The temperature of the cooking unit 16 would be sensed and controlled by the control sensor 15. As illustrated, the sensor 15 is embedded in the cooking unit 17. It will be appreciated that a heating unit of any desired type may be arranged with the cooking unit to generate heat therefor.

The sensor 15 includes generally a pair of substantially identical sheath conductor assemblies 18, a temperature sensitive resistance element 19, a cover 20 over the resistance element 19, and a ceramic insulant material 21 encapsulating the resistance element 19 within the cover.

The sheath conductor assemblies 18 are arranged in side by side relationship, and each assembly includes a tubular sheath 22 formed of a ductile metal, a terminal or conductor 23 extending through the sheath and protruding from opposite ends, and a ceramic insulant material 24 within the sheath and electrically insulating the terminal 23 from the sheath 22. The terminal or conductor 23 is in wire form and of an electrically conducting metal having a low coefficient of resistance change with temperature change. For example, a suitable material would be constantan. The ceramic insulant material may be magnesium oxide, aluminum oxide or any other suitable material capable of withstanding high temperatures and capable of being effectively used in the process for forming the sheath conductor assembly.

In the construction of a sheath conductor assembly, the terminal 23 is supported at both ends in relation to the metal sheath 22 at a center position within the sheath, while the space between the terminal and the inside of the sheath are filled with a powdered ceramic insulant material such as magnesium oxide. The sheath then is swaged or drawn to pack the material tightly within the sheath around the conductor, and thereby provide a sheath conductor assembly having the conductor or terminal extending therethrough and electrically insulated from the sheath. The packed insulant material completely and sealingly fills the area in the sheath between the sheath inner wall and the conductor, and will take on the character of a solid.

The temperature sensitive resistance element 19, which includes opposed leads 25 is then electrically connected to the adjacent ends of terminals 23 of side by side sheath conductor assemblies. Connection is made by welding or brazing the leads to the terminals.

The cover 20 includes a pair of identically formed cover plates 26, which are fabricated to define a U-shaped channel 27. The cover plates when brought together on the ends of the sheath conductor assembly 18 serve to enclose the temperature sensitive resistance element 19 and the connections to the terminals 23. Following the connection of the temperature resistance element 19 to the terminals 23, one of the cover plates 26 is secured to the sheaths 22 of the sheath conductor assembly 18 such as by spot welding at the points 28, FIG. 1. With the cover plate 26 in position, it forms a well or container into which ceramic insulating cement is applied to totally encapsulate the element 19, its leads and the ends of the terminals 23. Any suitable ceramic insulating cement may be used such as aluminum oxide in a sodium silicate binder. The cement is cured by applying heat and thereafter the other cover plate 26 is arranged in opposed relation to the first cover plate, and suitably spot-welded thereto such as at points 29, FIG. 1. It will be appreciated that the ceramic insulating cement essentially fills the area within the cover between the cover plates and the element 19, the leads 25 and the terminals 23 so that little if any gas space is left which might cause a blowout in the casting process. Further, the encapsulation of the temperature resistance element and its leads, and the associate ends of the terminal 23 precludes any possible molten metal from seeping in the interior of the cover to contact the leads and short out the resistance element. The cover 20 also provides a support for rigidly holding the sheath conductor assemblies together and for holding the resistance element in proper position relative the sheath assemblies to maintain integrity and to especially protect the resistance element and connections during casting in molten material. Thus, this embodiment is especially suitable for use in a solid mass. It can be appreciated that the cover plates 26 may be stamped from any ductile formable metal.

Figure 1:
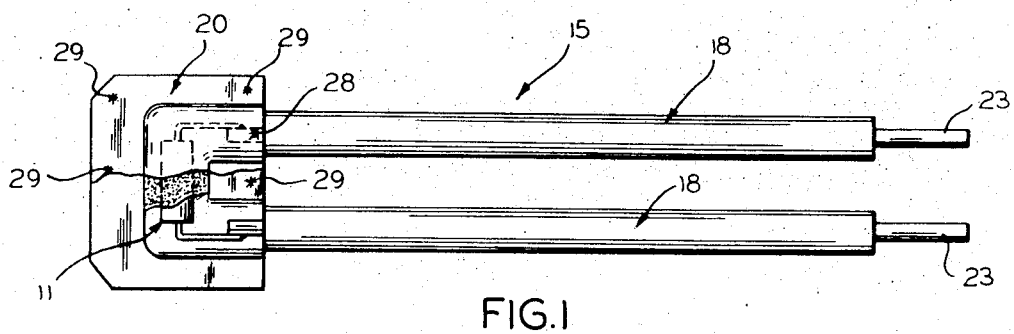
FIG. 1 is a top plan view of one form of the temperature sensitive control sensor according to the invention.
Figure 2:
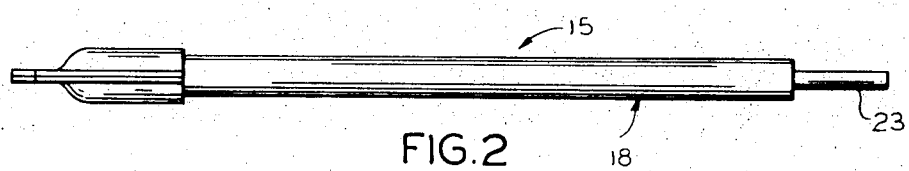
FIG. 2 is a front elevational view of the sensor in FIG. 1.
Figure 3:
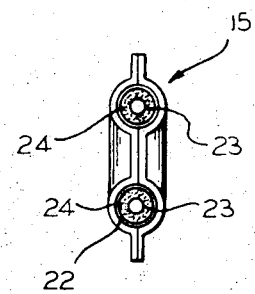
FIG. 3 is an end elevational view of the sensor in FIG. 1 looking at the terminal end.
Figure 4:
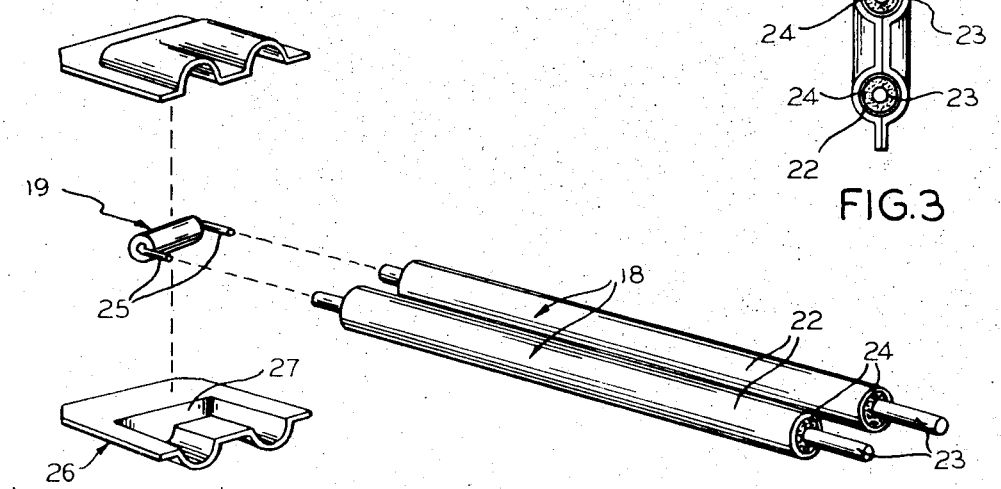
FIG. 4 is an exploded perspective view of the sensor in FIG. 1.
Figure 5:
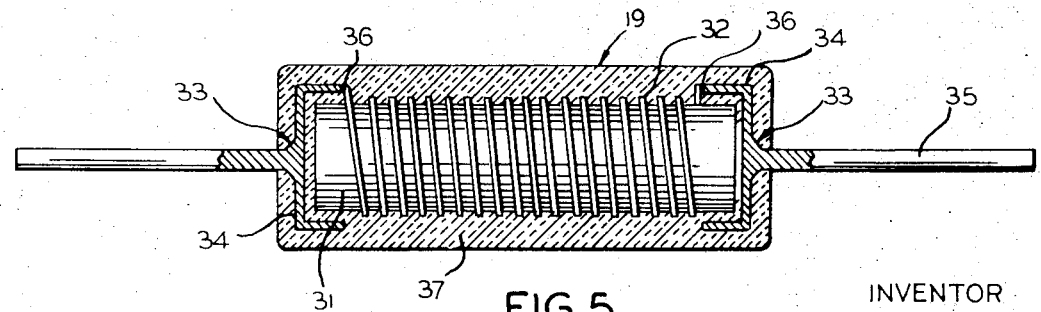
FIG. 5 is an enlarged axially sectional view taken through the temperature sensitive resistance element employed in the sensor of FIG. 1.

The temperature sensitive resistance element 19 is shown in detail in FIG. 5, and includes a cylindrically shaped ceramic core 31 having wound thereon in a helical manner a temperature sensitive resistance wire 32. Each winding is spaced from the next so that the wire is spatially wound on the core. The wire is of a type having a high co-efficient resistance change, and may, for example, be iron, an alloy of 70 percent nickel and 30 percent iron, or nickel. An end cap and lead assembly 33 is arranged at each end of the ceramic core 31. Each assembly includes a cup-shaped end cap 34 and a lead 35. The lead 35 is the same as that previously identified by the numeral 25 and more generally described when relating to the assembly sensor shown in FIGS. 1 to 4. The opposite ends of the resistance wire 32 are respectively welded or brazed to the opposing end caps 45 at points 36. The end cap and lead assemblies are of a suitable metal having a low coefficient of resistance change with temperature change. The ceramic core 31, is in rod form and vitrified conditions.

Following the connection of the resistance wire to the end caps, the assembly is coated with a heat resistive non-conductive coating 37. The coating may take the form of a ceramic insulating cement of the same type above described which is used to encapsulate the element 19, its leads and the terminals 23. Following the coating of the assembly, the coating is cured by applying heat to provide the completed resistance element 19. The ceramic cement when in cured condition is electrically non-conductive, and serves to bond the end caps to the ceramic core and to bond the resistance wire to the core and maintain each winding in spatial and insulated relationship.

Figure 7:
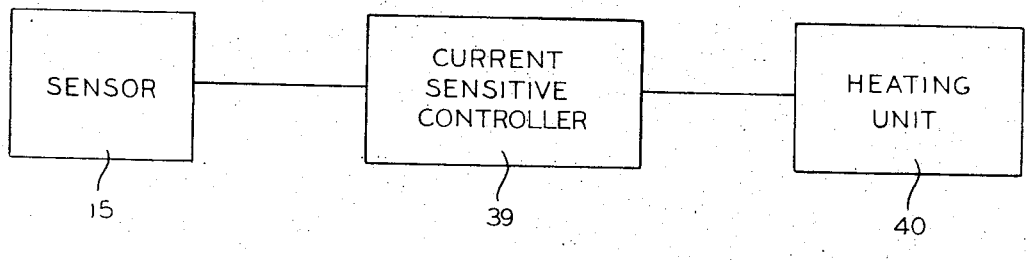
FIG. 7 is a block diagram of the sensor in combination with a controller and a heating unit.

The operation of the sensor shown in FIGS. 1 to 4 may be better understood by referring to the block diagram in FIG. 7. A sensor is connected to a current sensitive controller 39 which is in turn connected to a heating unit 40. The heating unit 40 may take any desirable form to apply heat to the cooking unit 16. For example, the heating unit may be in the form of an electric resistance element also embedded in the mass of the cooking unit, or in the form of a fuel burner applying heat to the underside of the unit. A constant voltage is applied to the sensor by the controller 39. Since the current flow in an electrical circuit is a function of circuit resistance, a change in the resistance of the temperature sensitive resistor 19 of the sensor 15 will produce a corresponding change in circuit current flow. The controller 39 responds to a current change to control the energy input of the heating unit to the cooking unit, whereby the energy input may be reduced or increased to counteract the energy loss or gain and maintain the temperature of the cooking surface 17 at a predetermined cooking temperature, such as about 385° F, within close limits to thereby insure consistent high quality and flavor of the food cooked.

Figure 8:
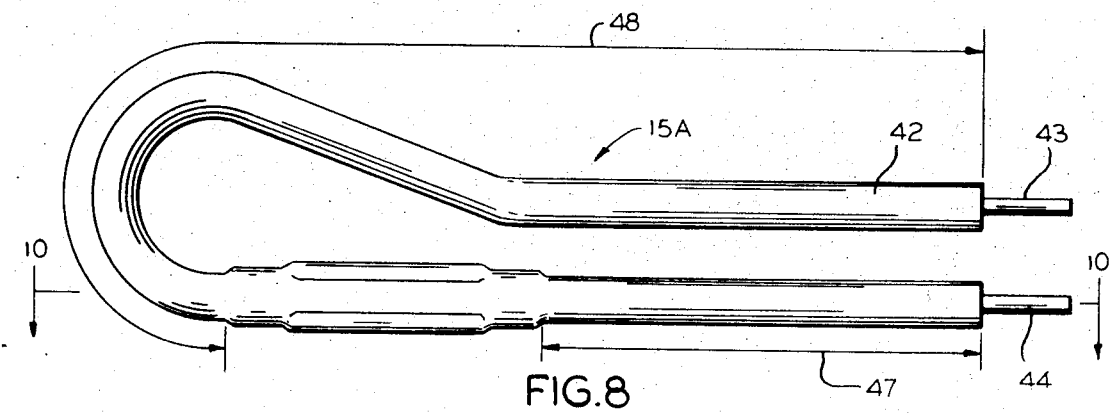
FIG. 8 is a top plan view of a modified sensor according to the invention.
Figure 10:
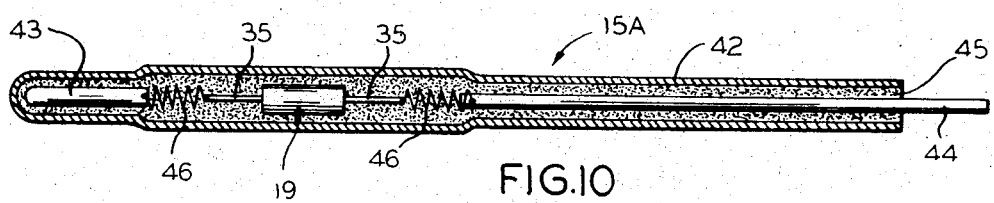
FIG. 10 is a longitudinal sectional view taken substantially along line 10—10 in FIG. 8.
Figure 9:
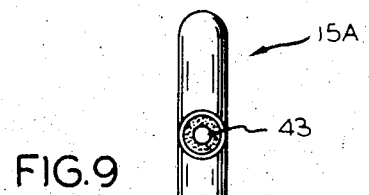
FIG. 9 is an end elevational view of the sensor in FIG. 8, taken from the terminal end.

Another form of temperature sensitive control sensor according to the invention is shown in FIGS. 8 to 10, wherein the sensor generally designated by the numeral 15A includes generally an elongated sheath 42, a temperature sensitive resistance element 19 mounted therein, and terminals or conductors 43 and 44. The temperature sensitive resistance element 19 is identical with that employed in the embodiments of FIGS. 1 to 4, but in mounting the resistor within the sheath, the leads 35 are maintained coaxial with the longitudinal axis of the element rather than being bent normally thereto as in the embodiment of FIGS. 1 to 4. A ceramic insulant material 45 is also arranged within the sheath and electrically insulates the terminals and resistor from the sheath.

The sheath 42 is of a suitable ductile metal such as that used with the sheath 22 of the first embodiment, while the ceramic insulant material 45 is of the same type as the material 24 in the first embodiment. It should also be appreciated that the terminals 43 and 44 are of the same material as the terminals 23 in the first embodiment, wherein they have a low coefficient of resistance change with temperature change.

In order to maintain the integrity of the sensor in its fabrication, inasmuch as a greater portion of the sheath is swaged or drawn to pack the ceramic insulant material about the conductors or terminals, which swaging effects an elongation of the sheath, the resistor leads 35 are electrically connected to the terminals 43 and 44 through spring conductors 46. Each lead 35 is welded or brazed to one end of a spring conductor, while the other ends of the spring conductors are welded or brazed to the corresponding ends of the terminals 43 and 44. This permits the absorption in change of length in the sheath during swaging without rupturing the connections between the resistor leads and terminals.

The fabrication of the sensor 15A includes the interconnection of the springs and terminals with the resistor leads and the mounting of same in a straight piece of sheath material. Following the filling of the sheath with a powdered ceramic insulant material, such as magnesium oxide, the sheath is swaged in the zones 47 and 48, FIG. 8, thereby compacting the ceramic insulant material and firmly anchoring the materials within the sheath. Elongation of the sheath in the swaging zones will not cause disconnection of the terminals with respect to the resistor lead because of the spring conductors 46 which are flexible. No reduction in diameter is performed in the area of the resistor and its spring conductors. However, the area of the sheath at the resistor 19 is crimped in order to maintain the centering of the resistor 19. Accordingly, all stresses between the terminals and resistor leads are relieved during the swaging operation by the spring conductors 46. The spring conductors may be in coil form and made from any ductile metal having a low co-efficient of resistance change with temperature change. The assembly after completion of the swaging and crimping operations is then formed, by conventional tube forming methods, into U-shape, as shown. Since this embodiment presents a completely sheath sealed unit it is not only useful in a solid mass, but also useful in a gas or liquid mass.

Figure 11:
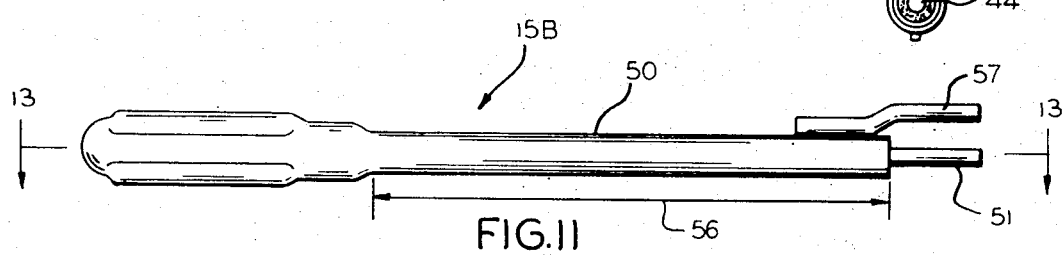
FIG. 11 is a top plan view of a further modified sensor according to the present invention.
Figure 13:
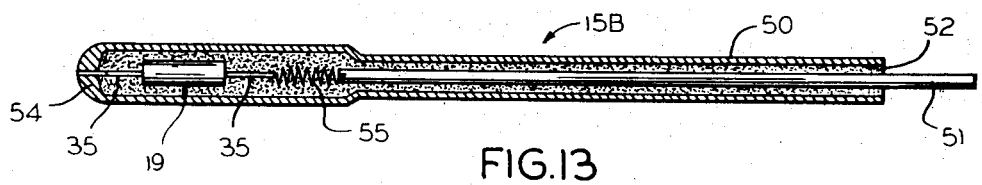
FIG. 13 is a longitudinal sectional view taken substantially along line 13—13 of FIG. 11.
Figure 12:
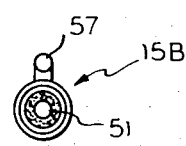
FIG. 12 is an end elevational view of the sensor of FIG. 11 taken from the terminal end.

Another embodiment of the invention is shown in FIGS. 11 to 13, wherein the sensor here, generally indicated by the numeral 15B includes a sheath 50, a terminal or conductor 51 electrically isolated from the sheath by ceramic insulant material 52, and the temperature sensitive resistor 19. Construction here is similar to that described relative to the embodiment in FIGS. 8 to 10, although one of the leads 35 of the resistor 19 is here electrically connected to the sheath which acts as one of the conductors in the sensor circuit. In this respect, one of the leads 35 is welded at 54 to the sheath 50 at one end thereof.

Like the embodiment of FIGS. 8 to 10, a stress relieving spring conductor 55 is connected to the other resistor lead 35 and in turn to the terminal 51 such as by welding or brazing. Following the insertion of the resistor 19, coil spring 55 and terminal 51 within the sheath, the one lead 35 of the resistor is welded to the one end of the sheath. Thereafter, powdered magnesium oxide or the like is introduced within the sheath to fill the area about the resistor, spring and terminal. The sheath is then swaged in the zone 56 which is in the area of the terminal 51. The spring 55 allows elongation of the sheath during swaging and compaction of the ceramic insulating material as performed on only one end of the assembly. As in the embodiment of FIGS. 8 to 10, the sheath is crimped in the area of the resistor 19 to maintain the resistor in centered relationship in respect to the sheath.

A second terminal 57 is then welded to the sheath 50 at the end where the terminal 51 protrudes from the sheath for subsequent connection of the sensor in the circuit of the controller. The operation of this sensor is the same as the other embodiments, but it will be appreciated that this configuration permits grounded sensor circuits where they are desired. Like the embodiment of FIGS. 8 to 10, this unit is completely sealed by the sheath and the weld at one end, and therefore it is likewise useful in solid, liquid or gas masses.

It will be understood that modifications and variations may be effected without departing from the scope of the novel concepts of the present invention, but it is understood that this application is to be limited only by the scope of the appended claims.

The invention is hereby claimed as follows:

1. A temperature sensitive control sensor for use in sensing temperature in a solid liquid or gas mass, said sensor comprising metal sheath means, a temperature sensitive resistance element having a lead at each end, terminal wire means extending from the sheath means and electrically connected to said element, and ceramic insulant material packed between the terminal wire means and sheath means by swaging of said sheath means, said temperature sensitive resistance element including a ceramic core, a temperature sensitive resistance wire wound on said core, said wire having a high coefficient of resistance change with temperature increase, means electrically connecting said leads to opposite ends of said resistance wire and said leads having a low coefficient of resistance change with temperature, and an electrically non-conductive heat resistive coating over the entire element except the ends of the leads.

2. The sensor as defined in claim 1, wherein said sheath means includes two side-by-side sheath assemblies including sheaths having terminals extending therethrough and protruding from opposite ends, ceramic insulant material between the sheaths and terminals and packed by swaging of the sheaths, means electrically connecting the leads of said element to adjacent ends of said terminals at one end of the sheaths, ceramic insulating means encapsulating the element, leads, and terminal ends, and rigid cover plates secured over the element and to the sheaths.

3. The sensor as defined in claim 1, wherein said sheath means includes a single continuous sheath, said terminal wire means including terminals extending from said sheath and inwardly from opposite ends and terminating short of each other, ceramic insulant material packed between the terminals and the sheath by swaging of the sheath in the area of the terminals, said resistance element being disposed within the sheath between the adjacent ends of the terminals, resilient conductor means in the form of coil springs connected between the terminals and the leads of said elements, and said sheath being U-shaped.

4. The sensor as defined in claim 1, wherein said sheath means includes a straight continuous sheath, said terminal wire means including a single terminal extending from the sheath and inwardly from one end and terminating short of the other end, ceramic insulant material packed between the terminal and sheath by swaging of the sheath in the area of the terminal, said resistance element being disposed within the sheath adjacent the inner end of the terminal and the adjacent end of the sheath, means connecting one lead of the element to the sheath, resilient conductor means in the form of a coil spring connecting the other lead to the terminal, and said terminal wire means including a second terminal connected to the exterior of said sheath.

5. A temperature sensitive control sensor for use in sensing temperature in a solid, liquid or gas mass, said sensor comprising metal sheath means, a temperature sensitive resistance element having a lead at each end, terminal wire means extending from the sheath means and electrically connected to said element, and ceramic insulant material packed between the terminal wire means and sheath means by swaging of said sheath means, said sheath means including a single continuous sheath, said terminal wire means including terminals extending from said sheath and inwardly from opposite ends and terminating short of each other, ceramic insulant material packed between the terminals and the sheath by swaging of the sheath in the area of the terminals, said resistance element being disposed within the sheath between the adjacent ends of the terminals, resilient conductor means in the form of coil springs connected between the terminals and the leads of said elements, and said sheath being U-shaped.

6. A temperature sensitive control sensor for use in sensing temperature in a solid, liquid or gas mass, said sensor comprising metal sheath means, a temperature sensitive resistance element having a lead at each end, terminal wire means extending from the sheath means and electrically connected to said element, and ceramic insulant material packed between the terminal wire means and sheath means by swaging of said sheath means, said sheath means including a straight continuous sheath, said terminal wire means including a single terminal extending from the sheath and inwardly from one end and terminating short of the other end, ceramic insulant material packed between the terminal and sheath by swaging of the sheath in the area of the terminal, said resistance element being disposed within the sheath adjacent the inner end of the terminal and the adjacent end of the sheath, means connecting one lead of the element to the sheath, resilient conductor means in the form of a coil spring connecting the other lead to the terminal, and said terminal wire mean including a second terminal connected to the exterior of said sheath.

7. A temperature sensitive resistance element for sensing temperature comprising a rigid core of electrical insulating material, a temperature sensitive resistance wire spatially wound on said core, said wire having a high coefficient of resistance change with temperature increase, lead means having a low coefficient of resistance change with temperature electrically connected to the opposite ends of said resistance wire, each lead means including an integral cap and lead wherein the cap is fittable over the end of the core, means connecting said lead means to said resistance wire, and electrically non-conductive heat resisting ceramic cement encapsulating said wire and core and said connecting means.

* * * * *